United States Patent [19]
Vowell et al.

[11] Patent Number: 5,999,295
[45] Date of Patent: Dec. 7, 1999

[54] STACKABLE NETWORK MODULES USING INFRARED COMMUNICATIONS

[75] Inventors: Aaron Vowell, Williamson County; Arnold Thomas Schnell, Iravis County, both of Tex.

[73] Assignee: Compaq Computer Corporation, Houston, Tex.

[21] Appl. No.: 08/626,202

[22] Filed: Mar. 29, 1996

[51] Int. Cl.⁶ .................................................. H04B 10/02
[52] U.S. Cl. ............................ 359/152; 359/163; 385/92
[58] Field of Search .................................... 359/152, 163, 359/164, 173, 159; 385/14, 31–89, 93, 92; 250/227.11

[56] References Cited

U.S. PATENT DOCUMENTS

| | | | |
|---|---|---|---|
| 5,093,879 | 3/1992 | Bregman et al. | 385/93 |
| 5,266,794 | 11/1993 | Olbright et al. | 250/214 LS |
| 5,412,506 | 5/1995 | Feldblum et al. | 359/569 |
| 5,448,675 | 9/1995 | Leone et al. | 385/135 |
| 5,475,215 | 12/1995 | Hsu | 250/227.11 |
| 5,532,856 | 7/1996 | Li et al. | 359/118 |
| 5,568,574 | 10/1996 | Tanguay et al. | 385/14 |
| 5,600,741 | 2/1997 | Hauer et al. | 385/35 |

FOREIGN PATENT DOCUMENTS

| | | |
|---|---|---|
| 0526776A1 | 2/1993 | European Pat. Off. . |
| 739629A1 | 6/1989 | Germany . |
| WO933/14514 | 7/1993 | WIPO . |

*Primary Examiner*—Rafael Bacares
*Attorney, Agent, or Firm*—Akin, Gump, Strauss, Hauer & Feld, LLP

[57] ABSTRACT

Stackable modules using infrared (IR) radiation for communication. Each module includes a housing with upper and lower holes and IR transceivers aligned with the holes. One of the two IR transceivers or transceiver sets detects IR communications through a lower hole and transmits through an upper hole, and the other detects IR communications through an upper hole and transmits through a lower hole. In this manner, the stackable module uses IR radiation to communicate with similar modules both above and below the module. The module further includes communication logic coupled to the transceivers to control communications between the transceivers of different modules. The module preferably includes a network device operating according to any desired network protocol. A stack network system includes a chassis with several slots, where one or more stackable modules are removably plugged into the slots of the chassis. Management may be distributed among the modules or centralized.

21 Claims, 5 Drawing Sheets

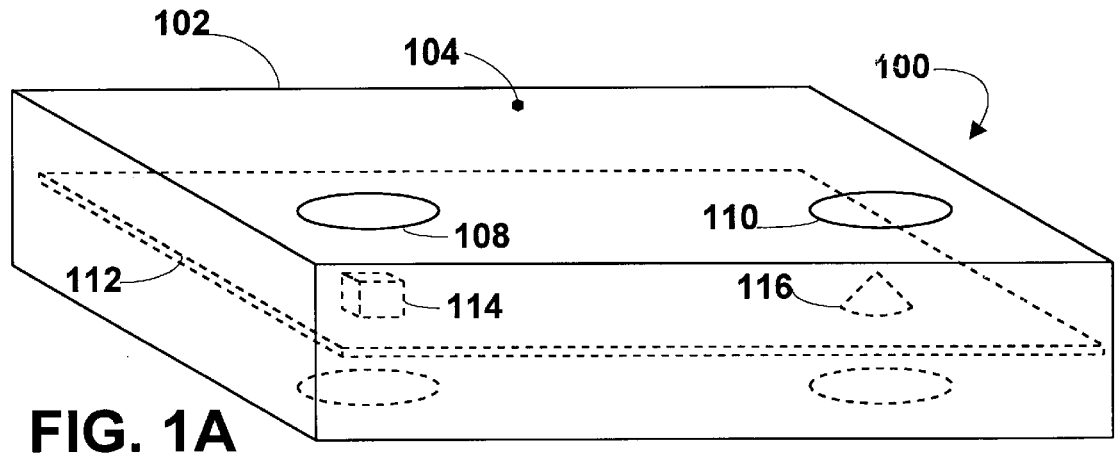
FIG. 1A
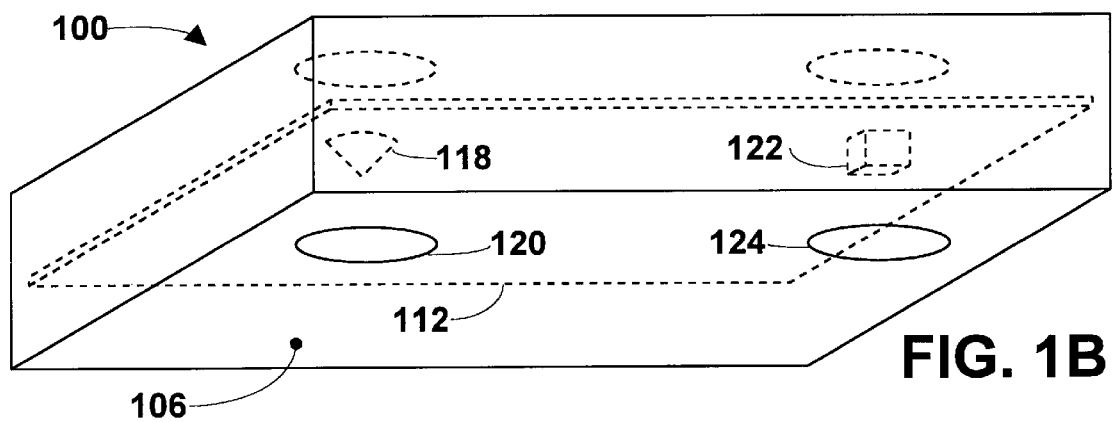
FIG. 1B
FIG. 2
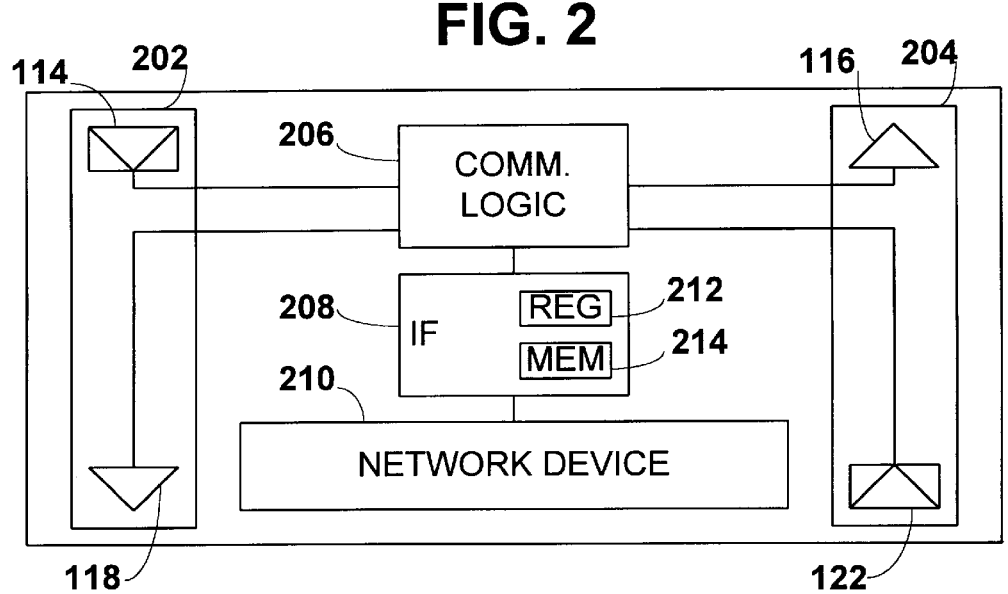

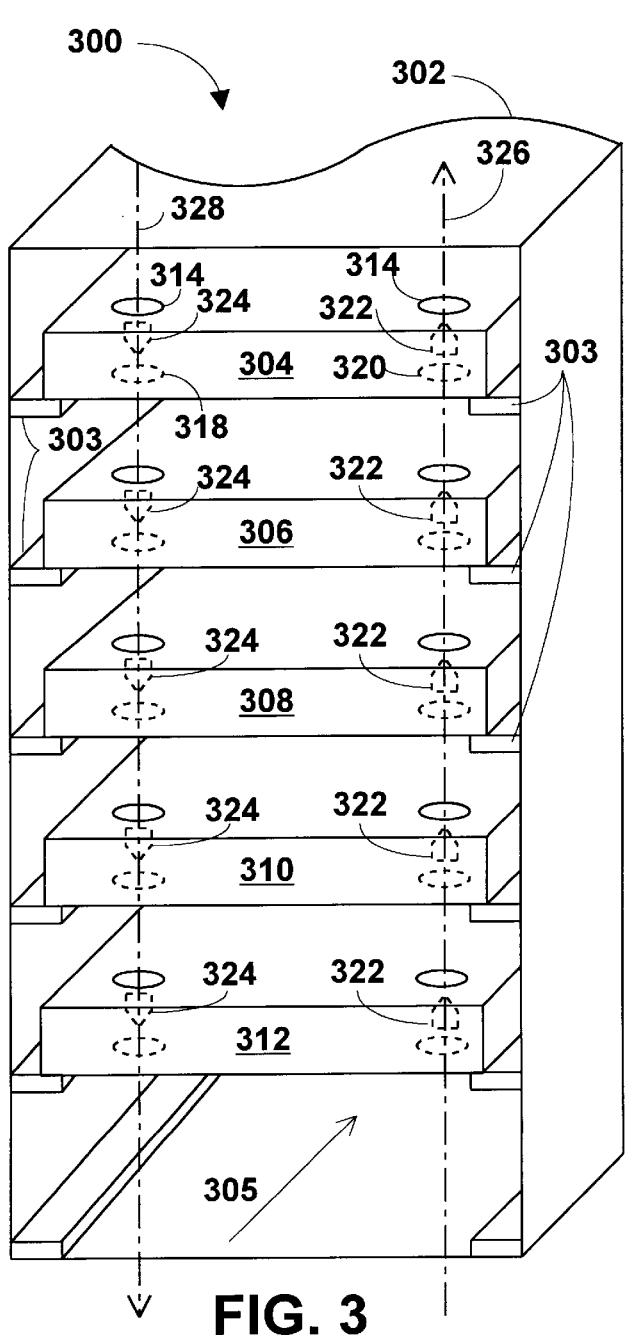
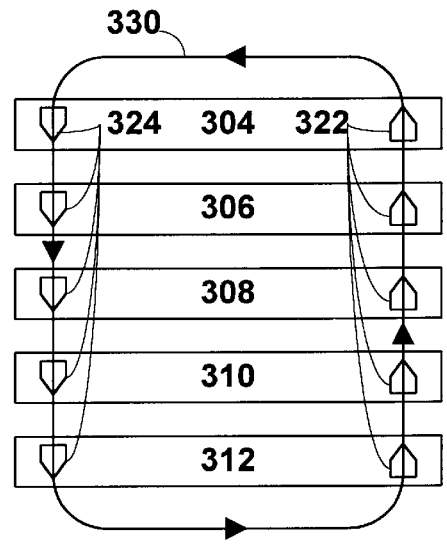
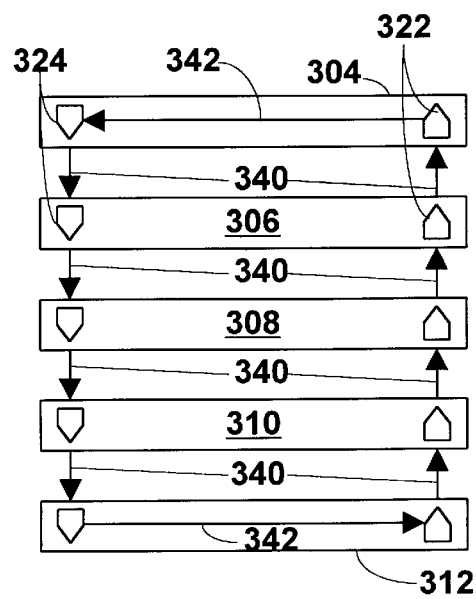
FIG. 3
FIG. 3A
FIG. 3B

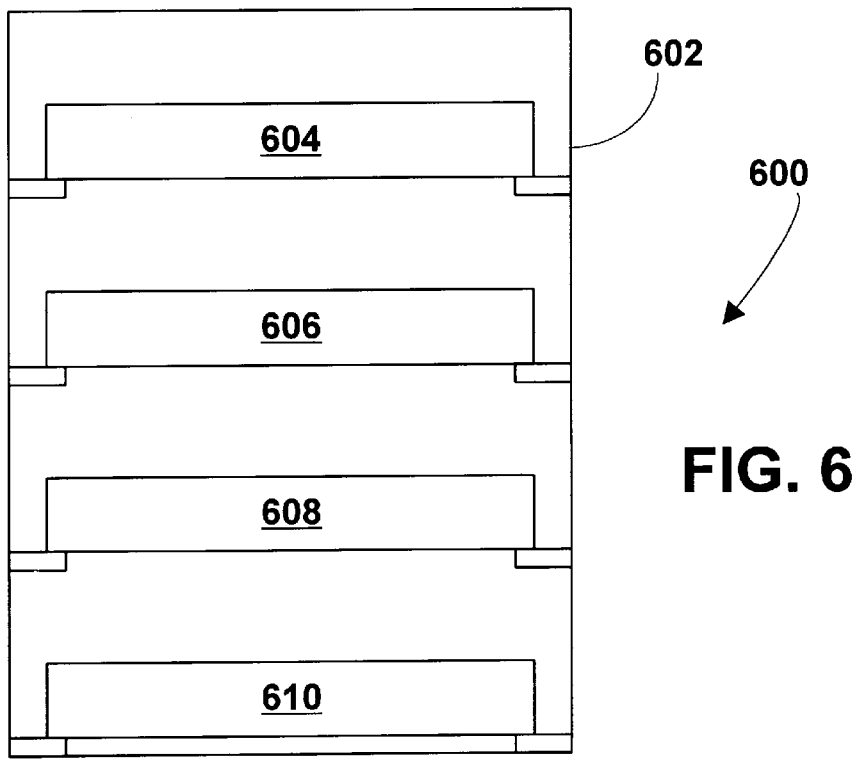
FIG. 6
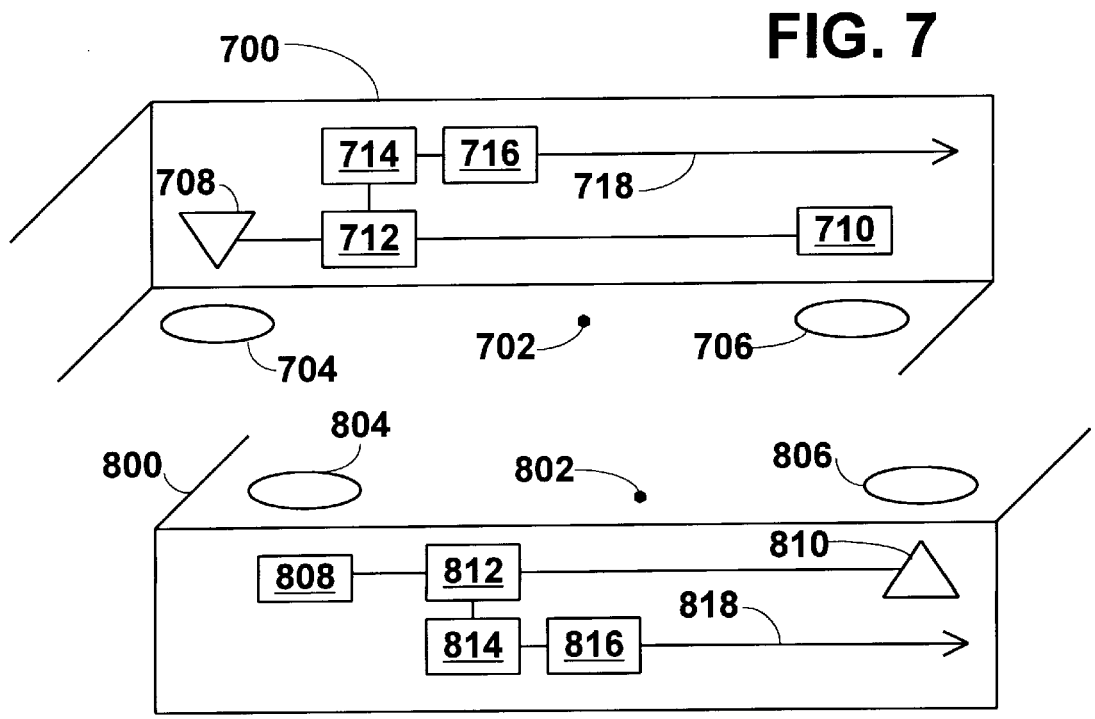
FIG. 7
FIG. 8

STACKABLE NETWORK MODULES USING INFRARED COMMUNICATIONS

FIELD OF THE INVENTION

The present invention relates to networking devices, and more particularly to stackable network modules using infrared communications for management functions.

DESCRIPTION OF THE RELATED ART

There are many different types of networks and network systems for sharing files and resources or for otherwise enabling communication between two or more computers and network devices. Networks may be categorized according to various features and functions, such as message capacity, range over which the nodes are distributed, node or computer types, node relationships, topology or logical and/or physical layout, architecture based on cable type and data packet format, access possibilities, etc. For example, the range of a network refers to the distance over which the nodes are distributed, such as local-area networks (LANs) within an office or floor of a building, wide-area networks (WANs) spanning across a college campus, or a city or a state, global-area networks (GANs) spanning across national boundaries, etc. The architecture of a network generally refers to the cabling or media and media access used as well as the packet structure of the data transmitted across the media. Various architectures are common, including Ethernet using coaxial, twisted pair or fiber-optic cables for operation at 10 megabits per second (Mbps) (e.g. 10Base-T, 10Base-F) or fast Ethernet operating at 100 Mbps (e.g. 100Base-T, 100Base-FX). ARCnet (Attached Resource Computer Network) is a relatively inexpensive network architecture using coaxial, twisted pair or fiber-optic cables for operation at 2.5 Mbps. Token Ring or Token Bus uses special IBM cable or fiber-optic cable for operation between 1–16 Mbps. Of course, many other types of networks are known and available.

Each network generally includes two or more computers, often referred to as nodes or stations, which are coupled together through selected media and various other network devices for relaying, transmitting, repeating, translating, filtering, etc., the data between the nodes. The term "network device" generally refers to any device connected to the network, including computers and their network interface cards (NICs), as well as various other devices on the network, such as repeaters, bridges, switches, routers, brouters, to name a few examples.

It is desired to monitor and/or configure each of the network devices for purposes of managing that network. For example, it may be desired to enable or disable and configure each of the ports of a multiport device, such as a repeater. Also, it may be desired to monitor the status of the ports or to monitor and retrieve statistical data about one or more ports on a network device. Thus, it is desired to communicate management data between the network devices. Each of the network devices may be configured to communicate management data to other network devices through their respective network channels and protocols for purposes of management. However, if the network channels or protocols are incompatible, then some type of converter or bridge device would be required to enable such communication. For example, a bridge would typically be required to enable a 10Base-T and a 100Base-T device to communicate with each other. Such converter devices add significant and undesirable cost to the system. More importantly, it is not desired to consume valuable time and resources on the respective networks by increasing traffic with management data. Also, not all of the network devices are sources or destinations of data and simply receive and re-send data. For example, an Ethernet repeater does not receive and decode packets, but simply repeats the packet on its other ports. Thus, the repeater would require modification of its network logic to enable management functions.

One possible solution is to add a common network protocol to each of the devices, such as ARCnet or the like, so that each device becomes a node on a separate management network. However, such a network must be relatively inexpensive and yet have enough data throughput to achieve the desired management functions. Although ARCnet is a relatively inexpensive architecture, it requires significant overhead for encoding and decoding packets and inserting wait states, thereby decreasing typical data throughput to approximately 1 Mbps.

Another possible solution is to incorporate a known input/output (I/O) bus structure to all of the network devices, such as the 8-bit PC bus, the industry standard architecture (ISA) or AT bus, the Extended ISA (EISA) bus, the Micro Channel Architecture® by IBM (MCA), the peripheral component interconnect (PCI) bus, etc. Each of these bus structures provide memory mapped transactions and would enable sufficient throughput for the desired management functions of network devices. However, such bus structures are also relatively expensive and require a significant number of bus signals. An 8-bit PC bus, for example, requires at least 31 pins or signals, and the 16-bit ISA bus adds at least 18 more pins to the PC bus. The EISA bus adds 55 pins to the ISA bus. The MCA bus includes at least 46 pins for its basic 8-bit section. Another problem with these bus solutions is the cost of associated cables and connectors. Cables and connectors are inherently expensive because of the amount of manual labor involved. Fiber optic cables and connectors are even more expensive than conductor-based cabling and connectors.

Another possible solution is to use a serial channel for communications. However, serial communications are relatively expensive for the amount of data throughput available. Common throughput rates are 9600, 14,400, 19,200 and 28,800 bits at unit density (baud). Higher baud and/or bit rates may be available, but at significant increase in cost. Serial communications must also include cabling and connectors as well as the appropriate serial ports, such as RS232 serial ports.

It is desired to enable communication between network devices for purposes of managing the devices and the network without adding significant cost to the network system.

SUMMARY OF THE INVENTION

A stackable module according to the present invention uses infrared (IR) radiation to communicate with at least one other stackable module. The module includes a housing with upper and lower holes and transceivers aligned with the holes. In particular, the housing includes an upper surface with two holes aligned with two corresponding holes in a lower surface. The module further includes a first IR transceiver mounted within the housing and aligned between one pair of aligned holes and a second IR transceiver mounted within the housing and aligned between the other pair aligned holes. Such alignment enables line-of-sight IR communications. In particular, one of the two transceivers detects IR communications through a lower hole and transmits through an upper hole, and the other transceiver detects IR communications through an upper hole and transmits through a lower hole. In this manner, the stackable module uses IR radiation to communicate with similar modules both above and below the module.

Each IR transceiver includes an IR transmitter and an IR detector. The module further includes communication logic coupled to the transceivers to control communication. The communication logic preferably includes state machines, buffers, latches, registers, memory, etc. for receiving, storing and transmitting data. The module preferably includes a network device operating according to any network protocol, such as Ethernet, ARCnet, Token Ring, etc. The module also includes interface logic coupled between the communication logic and the network device, so that an external device or manager is able to monitor the status, change the configuration or otherwise receive statistical information from the network device. The interface logic includes one or more status or configuration registers and memory to facilitate management functions.

In an alternative embodiment, the stackable module includes a plurality of upward facing IR transceivers and a plurality of down-ward facing IR transceivers. Thus, the present invention is not limited to a single data path and may include multiple IR data paths.

A stack network system according to the present invention includes a chassis having a plurality of slots, where one or more stackable modules are removably plugged or installed into corresponding ones of the slots of the chassis. The present invention is not limited by any particular communication protocol implemented between the stacked modules. The communication logic is implemented to control communications according to any appropriate protocol for IR radiation. For example, the communication logic may operate the IR transceivers as a bus configuration, where each module arbitrates for the bus and sends data to one or more modules while controlling the bus. Each of the IR transceivers receive and retransmit the received data to implement the bus configuration.

Alternatively, the communication logic may operate the IR transceivers as a link configuration, where IR communications received by either of the IR transceivers is decoded by the communication logic to determine the destination of the data. If the data is not intended for that module, the infrared communication is retransmitted to the next module in the stack. In yet another alternative embodiment, the communication logic operates the IR transceivers in a daisy-chain configuration, where one transceiver always relays or retransmits the data while the other IR transceiver provides the data to the communication logic for decoding. The communication logic decodes the data to determine its destination, and retransmits the data if not intended for that module.

A stackable configuration according to the present invention uses either distributed or centralized network management. In the embodiments described above, the management is distributed among the modules. In a centralized configuration, any one or more of the modules is a stack manager including management control logic coupled to the communication logic. The stack manager is either stand-alone, or is coupled to and controlled by a separate network manager through a communication interface. The network manager may either be a computer system or any other type of network device including management logic. In the preferred embodiment, the stack manager and network manager communicate using a network communication interface coupled between the stack and network managers.

The stack manager is preferably implemented as a stackable module for placement in any one of the slots of the chassis. However, the stack manager may also be implemented as either a top-mounted or bottom-mounted stack manager, which is placed in either the top-most or bottom-most slot, respectively, of the chassis. The advantage of a top- or bottom-mounted stack manager is cost savings since only one IR transmitter and one IR detector is required, rather than two complete IR transceivers per data path. Otherwise, the top- or bottom-mounted stack manager operates in substantially the same manner as a stackable manager.

BRIEF DESCRIPTION OF THE DRAWINGS

A better understanding of the present invention can be obtained when the following detailed description of the preferred embodiment is considered in conjunction with the following drawings, in which:

FIG. 1A is a perspective and partially hidden view illustrating the top side of a stackable module according to the present invention;

FIG. 1B is a perspective and partially hidden view illustrating the bottom side of the module of FIG. 1A;

FIG. 2 is a block diagram of the stackable module of FIGS. 1A and 1B;

FIG. 3 is a perspective view of a modularized stacked configuration of stackable modules according to the present invention;

FIG. 3A is a diagram illustrating a bus protocol of the configuration of FIG. 3;

FIG. 3B is a diagram illustrating a link protocol of the configuration of FIG. 3;

FIG. 6 is a block diagram of another modularized stacked configuration of stackable modules according to the present invention;

FIG. 7 is a block diagram of a top-mounted stack manager for use in the configuration of FIG. 6;

FIG. 8 is a block diagram of a bottom-mounted stack manager for use in the configuration of FIG. 6;

DETAILED DESCRIPTION OF THE PREFERRED EMBODIMENT

Figure 4:
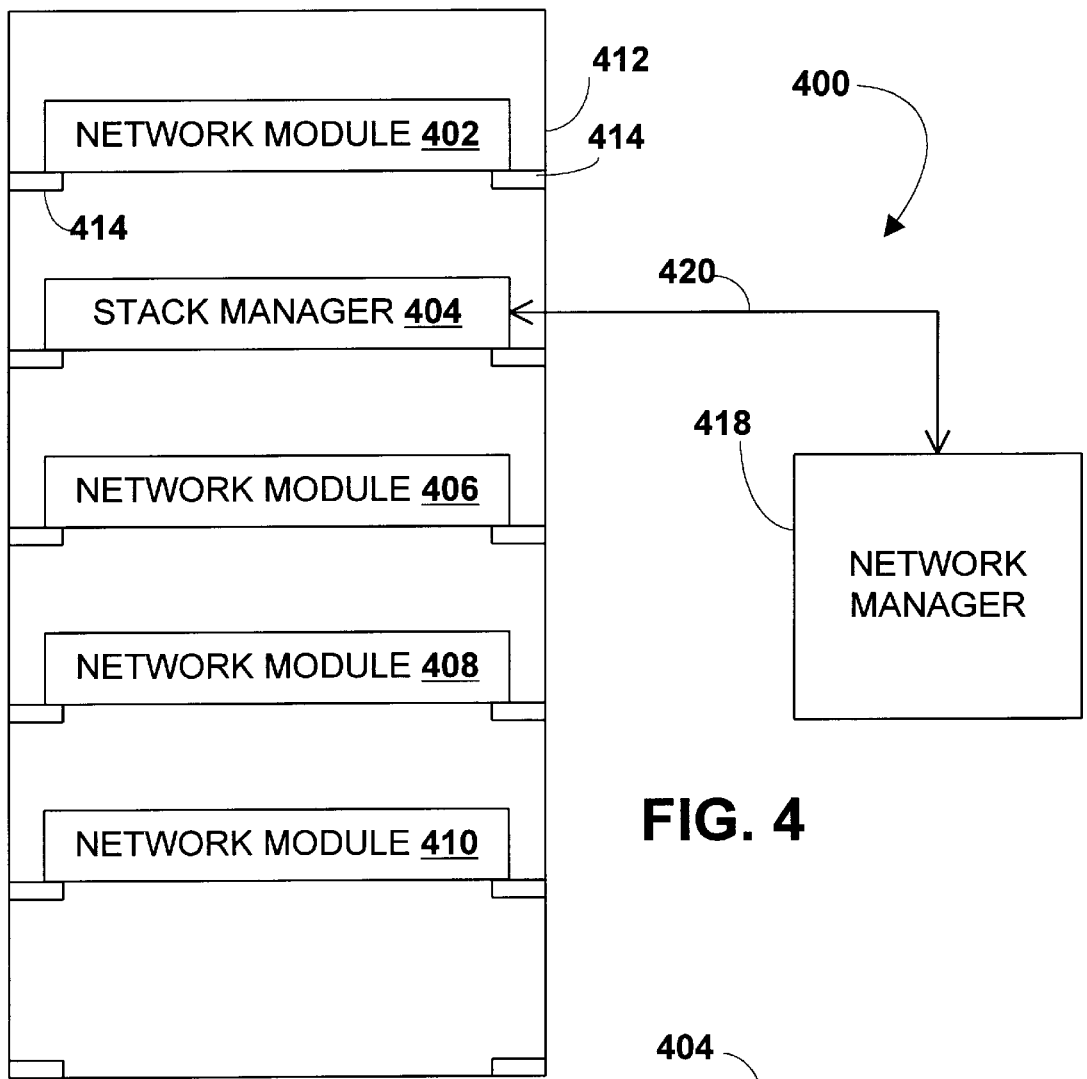
FIG. 4 is a block diagram of a modularized stacked configuration of stackable modules including a stack manager according to the present invention.

Referring now to FIG. 1A, a perspective and partially hidden view is shown of a stackable module 100 according to the present invention. The module 100 includes a body or housing 102, which is preferably a box-like and rectangular structure including a relatively flat upper surface 104 and a relatively flat lower surface 106 (FIG. 1B). The upper surface 104 includes two holes 108 and 1 10 exposing corresponding portions of a printed circuit board (PCB) 112 mounted within. An infrared (IR) detector 114 is preferably mounted on the upper side of the PCB 112 and aligned with the hole 108. The IR detector 114 is preferably an IR transducer, such as a semiconductor, a thermocouple bolometer, or the like, for detecting digital data transmitted using IR radiation through the hole 108. An IR transmitter 116 is also mounted to the upper side of the PCB 112, but aligned with the hole 110. The IR transmitter 116 preferably includes an IR emitter, such as a transistor or IR light-emitting diode (LED) semiconductor device or the like, for transmitting data using IR radiation to an external device through the hole 110. In this manner, the module 100 transmits and receives data using IR radiation to another device or module located above the module 100.

FIG. 1B is a perspective and partially hidden view illustrating the bottom side of the module 100. The bottom surface 106 also includes two holes 120 and 124, which are preferably aligned with the holes 108 and 110, respectively. An IR transmitter 118, similar to the IR transmitter 116, is preferably mounted on the lower surface of the PCB 112 and aligned with the hole 120 for transmitting data using IR radiation through the hole 120 to an external device or module. Similarly, an IR detector 122, similar to the IR detector 114, is preferably mounted to the lower surface of the PCB 112 and aligned with the hole 124 for detecting data sent using infrared radiation directed through the hole 124 from another device or module. In this manner, the module 100 transmits and receives data using IR radiation to another device or module located both above and below the module 100.

It is noted that the PCB 112 provides a convenient base for mounting the IR devices 114, 116, 118 and 122. However, these IR devices may be mounted in any appropriate manner and aligned with the corresponding one of the holes 108, 110, 120 and 124. The IR radiation transmitted by the IR transmitters 116 and 118 and detected by the IR decoders 114 and 124 incorporate intelligence, preferably in the form of digital data. The IR radiation generally operates in a line of sight configuration, where the data is preferably directed orthogonal to the holes 108, 110, 120 and 124. This is referred to as IR communication herein.

Referring now to FIG. 2, a simplified block diagram is shown of the module 100. The IR detector 114 and IR transmitter 118 are a part of an IR transceiver 202. Likewise, the IR detector 122 and IR transmitter 116 are a part of another IR transceiver 204. Both of the transceivers 202 and 204 are further coupled to communication logic 206 for sending and receiving data through the IR transceivers 202 and 204. In particular, the IR detectors 114 and 122 are coupled to receive IR radiation and extract digital data from the IR radiation, which digital data is then provided to the communication logic 206. Likewise, the IR transmitters 116 and 118 are coupled to receive digital data from the communication logic 206, encode the data into IR radiation, and transmit the data through the respective holes 110 and 120. The communication logic 206 preferably includes one or more state machines and/or receive and transmit buffers as desired to facilitate IR communications. The communication logic 206 is preferably coupled interface logic 208, which is further coupled to a network device 210 incorporated within the module 100. The interface logic 208 preferably includes one or more status and configuration registers 212 for determining the status of, and for configuring the network device 210. Memory 214 is also preferably provided within the interface logic 208 for facilitating data exchange between the communication logic 206 and the network device 210.

The network device 210 may be implemented as any one of several different network device types known to those skilled in the art, such as a hub, concentrator, switch, bridge, repeater, network interface card (NIC), etc. The network device 210 may be single port or multiport and may operate according to any one or more protocols or architectures, such as, for example, Ethernet (10Base-T, 100Base-T, 100Base-FX, etc.), Token Ring, VG (voice-grade), ARCnet, FDDI (Fiber Distributed Data Interface), CDDI (Copper Distributed Data Interface), ATM (Asynchronous Transfer Mode), etc. Further, the network device 210 may be configured according to any type of network physical or logical topology, such as linear, bus, star, ring, star-wired ring, etc. The present invention is not limited to any particular type or configuration of network or network device 210.

FIG. 2 clearly illustrates that the module 100 enables digital communication between external devices both above and below the module 100 using IR communications. Thus, it is appreciated that the network device 210 may be monitored and controlled by an external device communicating with the module 100 using IR communications. Any particular protocol of the IR communications and the digital data may be used. For example, the data may be packetized, such as is common in network communications. The data may also be sent in serial format, such as is common in serial communications. IR radiation is generally in the range of 300 giga-hertz (GHz) to $400 \times 10^{12}$ (or having a wavelength between 1,000 nano-meters (nm) and 750 nm). In this manner, the module 100 uses wireless communication, yet does not transmit electromagnetic radiation or radio frequencies (RF) which are regulated, which require compliance with certain regulations or which would otherwise require a license for transmission. IR communication enables a generous range of data throughput, where data may be transferred using frequency ranges of several hundred kilohertz (kHz) to 100 megahertz (MHz) or more. Bit rates on the range of 100 megabits per second (Mbps) are possible and easily achievable. IR communication operates according to line of sight using IR transmitters and detectors, so that cables and associated connectors, typically associated with conductive wire or fiber optics, are eliminated.

Referring now to FIG. 3, a perspective view is shown of a modularized stacked configuration 300 according to the present invention. A chassis 302 is provided with appropriate shelves 303 for implementing a plurality of slots 305. The slots 305 are implemented to receive and support a plurality of modules 304, 306, 308, 310, 312, etc. (304–312), in a spaced and preferably orthogonal relationship with each other. Although only five modules 304–312 and six slots 305 are shown, the chassis 302 may include any number of slots for receiving any number of modules as desired. Preferably, each of the modules 304–312 are implemented in a similar fashion as the module 100. In particular, each of the modules 304–312 include upper surface holes 314 and 316, lower surface holes 318 and 320. Furthermore, each of the modules 304–312 include upward facing IR transducers 322 aligned with the holes 316, 320 and downward facing IR transducers 324 aligned with the holes 314, 318, along with necessary communication logic, such as the communication logic 206, for controlling data flow. Also, each of the modules 304–312 includes a network device, such as the network device 210. In this manner, each of the modules 304–312 communicates using IR communications with a module above it, if present, as well a module below it, if present. A centerline 326 illustrates upward data flow through the IR transducers 322, and another centerline 328 illustrates downward data flow through the IR transducers 324.

Management of the plurality of modules 304–312 is preferably distributed among the modules. Such management functions and logic is incorporated into the communication logic of each module, such as the communication logic 206 shown in FIG. 2. However, any one or more of the modules 304–312 may also be a stack manager, as further described below.

The present invention is not limited by any particular data protocol used by the modules 304–312 to communicate with each other. For example, FIG. 3A is a diagram illustrating a modularized configuration according to FIG. 3 using a bus protocol. All of the modules 304–312 communicate with each other through a transmission path or bus 330, shown as a circular line extending through the IR transceivers 322 and 324, and only one of the modules 304–312 has control of the bus 330 at any given time. Each of the transceivers 322 and 324 relay all data received, where all IR transmissions received by each IR detector is immediately repeated by the corresponding IR transmitter. Thus, each of the modules 304–312 needing to transmit data arbitrates for the bus 330, and the winning module sends data across the bus 330 to any one or all of the other modules. The communication protocol preferably includes an address or unique identifier number for each of the modules 304–312, where the transmitting module uses the address or identifier of the targeted module. Each of the modules 304–312, therefore, monitor the addresses asserted on the bus 330 to determine if it is being accessed. For example, if the module 306 wishes to transmit data to the module 312, the module 306 gains control of the bus 330, asserts an address on the bus 330 identifying the module 312, and then asserts its data on the bus 330. The module 312 detects the address and determines that the data is intended for it, and retrieves the data.

Each of the modules 304–312 use either one or both of their IR detectors to monitor the data. Since the data is simply repeated across the entire bus 330, the IR detector of one of the IR transceivers, such as the transceiver 324, may be used to monitor data on the bus 330, while the other IR transceiver 322 is used only to relay data. Alternatively, each of the modules 304–312 may monitor data on the bus 330 using both IR detectors.

FIG. 3B illustrates a link protocol for the configuration 300 of FIG. 3. In particular, a communication link 340 is shown between each of the IR transceivers 324 and between each of the IR transceivers 322. The top module 304 and bottom module 312 include links 342 representing data flow between the IR transceivers 322 and 324. Each of the links 340 and 342 are preferably independent of every other link, so that multiple data sets may be transmitted between several modules at a time. For example, the module 304 sends data using its IR transceiver 324 intended for the module 306 across a link 340, where the module 306 receives the data using its IR transceiver 324. The module 306 does not repeat the data, so transmission is completed. Meanwhile, the module 312 may simultaneously send data using its IR transceiver 322 to the module 308. The module 310 intercepts the data using its IR transceiver 322, determines that the data is not intended for it and relays the data to the module 308. Each of the modules 304–312 preferably includes appropriate communication logic and transmit and receive buffers in the event data is being received by an IR transceiver that is also transmitting data to another module. This assures that data is not lost. The links 342 are optional and not necessary in this embodiment since data would not need to reverse direction.

In an alternative daisy chain embodiment using the link configuration 300 shown in FIG. 3B, data always flows in one direction, such as clockwise or counterclockwise. Further, only one of the IR transceivers, such as the transceiver 324, is used by each module to monitor data. The IR transceiver 322 is used only to relay data. In this embodiment, the links 342 are necessary to relay the data if not intended for the top-most module 304 or the bottom-most module 312. For example, if the module 310 intends to send data to the module 312, it transmits the data to module 308, which relays the data to module 306, which relays the data to module 304. Module 304 transfers the data from its IR transceiver 322 to its other IR transceiver 324, and re-transmits the data back to the module 306, which relays the data to the module 308, which relays the data to the module 310, which relays the data to the module 312.

It is noted that in this embodiment, there is also a mechanism for the module 304 to determine that it is the topmost module, and for the module 312 to determine that it is the bottom-most module, since the configuration may change at any time by removal or insertion of modules. There are several mechanisms for such determination. In general, each of the modules 304–312 monitor data activity of the IR detector of its IR transceiver 324 to determine whether a module is above that module. Likewise, each of the modules 304–312 monitor data activity of the IR detector of its IR transceiver 322 to determine whether a module is below that module.

Referring now to FIG. 4, a front view and partial block diagram is shown of a modularized stacked configuration 400 of stackable modules 402, 404, 406 408 and 410. The module 404 is configured as a stack manager according to the present invention. In this manner, the management functions of the configuration 400 are centralized within the stack manager 404, rather than being distributed among the stacked modules. The configuration 400 includes a chassis 412 and shelves 414 for implementing a plurality of slots 416 for mounting a plurality of stackable network device modules. The stackable modules 402–410 are preferably implemented in a similar manner as the module 100 shown in FIG. 1, and may be plugged into any one of the slots 416. The stack manager 404 is also implemented in a similar manner as the stack module 100 and is plugged into any of the slots 416 of the chassis 412. However, the stack manager 404 further includes management control logic 508, described further below, for managing each of the stackable network devices 402–410. The stack manager 404 may be stand alone, but may optionally be connected to a network manager 418 through a communication channel 420. In the preferred embodiment, the communication channel 420 is itself a network connection, where the network manager 418 is preferably a computer system, such as an Compaq personal computer (PC) or the like, which includes a network interface card (NIC) (not shown) for interfacing with the stack manager 404. The network manager 418 operates to manage all of the network devices incorporated within the modules 402–410 of the network system.

Figure 5:
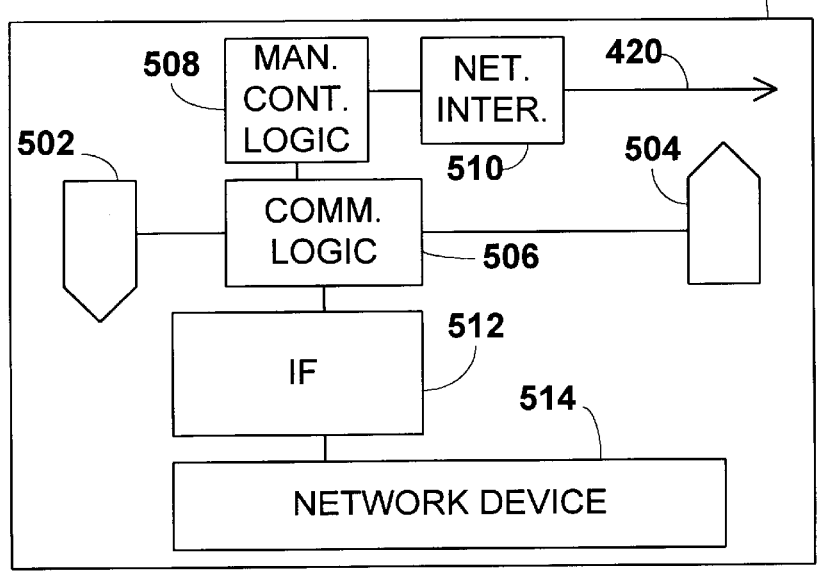
FIG. 5 is a block diagram of the stack manager of FIG. 4.

Referring now to FIG. 5, a block diagram is shown of the stack manager 402. The stack manager 402 includes two transceivers 502 and 504 coupled to communication logic 506 in a similar manner as described for the module 100. Thus, the IR transceiver 502 receives communications from a module above it, if present, and transmits to a module below it, if present, whereas the IR transceiver 504 detects communications from the module below it and transmits to the module above it, if present. The communication logic 506 is further connected to the management control logic 508, which is further coupled to a network interface 510. The network interface 510 is coupled to the network manager 418 through the communication channel 420. In this manner, the network manager 418 and the stack manager 404 have full communications capability for enabling control of all of the modules 402–410 of the configuration 400 shown in FIG. 4. The stack manager 404 may be a dedicated manager, but may optionally include interface logic 512 coupled to the communication logic 506, and a network device 514 coupled to the interface logic 512 in a similar manner as shown in FIG. 2.

Referring now to FIG. 6, a diagram is shown of another modularized stacked configuration 600 according to an alternative embodiment of the present invention. The configuration 600 is similar to the configuration 400 and includes a chassis 602 and stackable network modules 604, 606, 608 and 610. In this configuration, however, a stack manager is placed either at the top location, as module 604, or a the bottom location, as module 610. Thus, the configuration 600 preferably has its management functions centralized within a stack manager, rather than being distributed. Of course, distributed management functions may also be included.

FIG. 7 is a block diagram of a top-mounted stack manager 700, which could be used as the top-most module 604 in FIG. 6. The top-mounted stack manager 700 includes a bottom surface 702 with two holes 704 and 706. The top-mounted stack manager 700 does not include two full IR transceivers, but instead includes an IR transmitter 708 aligned with the hole 704 and an IR decoder 710 aligned with the hole 706. The IR devices 708, 710 are both preferably mounted on an internal PCB board, and are both coupled to communication logic 712, which is adapted for receiving data from the IR detector 710 and transmitting data through the IR transmitter 708. The communication logic 712 is further connected to management control logic 714, which is connected to a network interface 716 for interfacing a communication channel 718, if desired, in a similar manner as shown in FIG. 5. Also, the stack manager 700 may optionally include interface logic and a network device, if desired.

FIG. 8 is a block diagram of a bottom-mounted stack manager 800, which is similar to the top-mounted stack manager 700. However, the stack manager 800 could be used as the bottom-most module 610 in FIG. 6. The stack manager 800 includes an upper surface 802 with two holes 804 and 806. An IR detector 808 is aligned with the hole 804 and an IR transmitter 810 is aligned with the hole 806. The IR devices 808, 810 are both preferably mounted on an internal PCB board, and are both coupled to communication logic 812, which is adapted for receiving data from the IR detector 808 and transmitting data through the IR transmitter 810. The communication logic 812 is further connected to management control logic 814, which is connected to a network interface 816 for interfacing a communication channel 818, if desired, in a similar manner as shown in FIG. 7. Also, the stack manager 800 may optionally include interface logic and a network device, if desired.

Figure 9:
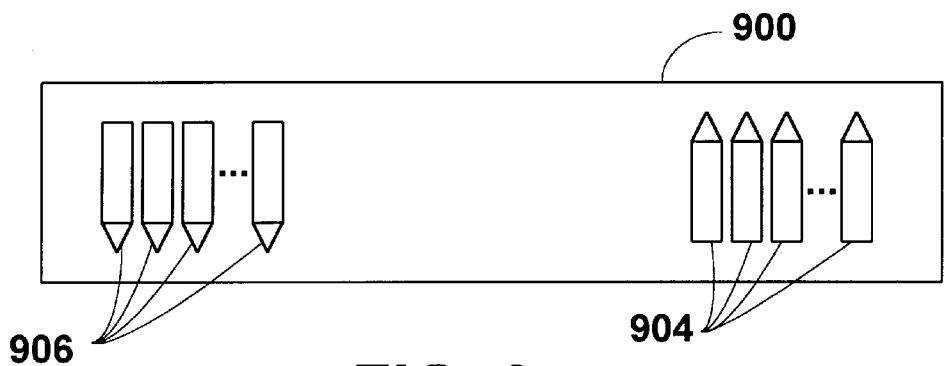
FIG. 9 is a front view of a stackable module according to another alternative embodiment of the present invention.
Figure 9A:
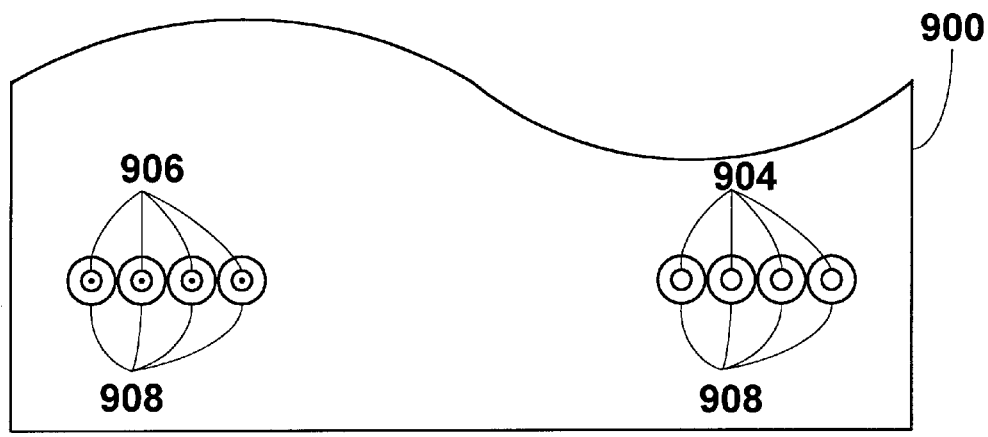
FIGS. 9A and 9B are alternative top views of the module of FIG. 9.
Figure 9B:
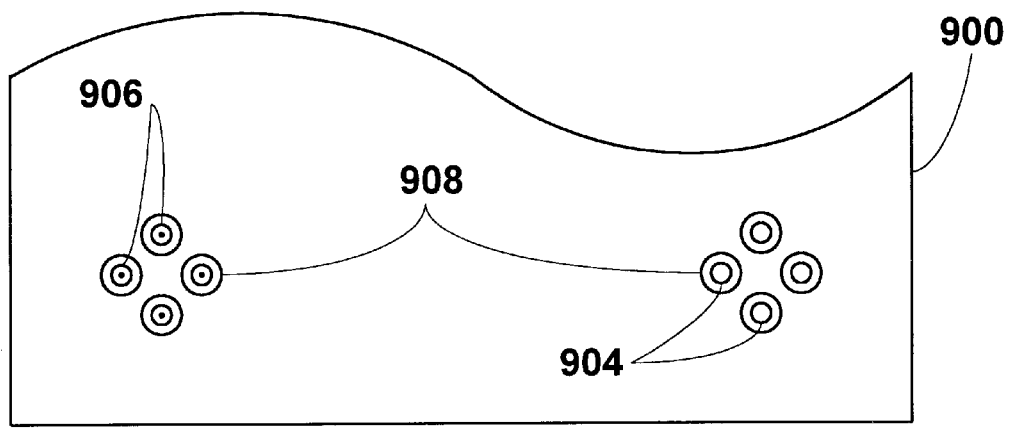

FIG. 9 is a front view of a stackable module 900 according to another alternative embodiment of the present invention. The module 900 is implemented in a very similar manner as the stackable module 100, except that the module 900 includes a plurality of upward facing IR transceivers 904 and a corresponding plurality of downward facing IR transceivers 906. In this manner, a plurality of consecutive and data independent signals may be transmitted at any given time. The plurality of IR transceivers 904 and 906 preferably implement a bus structure, such as an input/output (I/O) bus of a computer system, where the plurality of IR signals comprise bus signals performing bus cycles. The IR transceivers 904, 906 may be organized in any desired manner, such as linearly, as shown in FIG. 9A, in a circular configuration, as shown in FIG. 9B, or in any other desired configuration. A hole 908 is preferably provided for each IR transceiver 904, 906.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A stackable module using infrared radiation to communicate with at least one other stackable module, comprising:

a housing having an upper surface and a lower surface, said upper surface having first and second holes and said lower surface having first and second holes aligned with said first and second holes of said upper surface, respectively;

a first infrared transceiver mounted within said housing and aligned between said first holes of said upper and lower surfaces for transmitting through said first hole of said lower surface and for receiving through said first hole of said upper surface; and a second infrared transceiver mounted within said housing and aligned between said second holes of said upper and lower surfaces for transmitting through said second hole of said upper surface and for receiving through said second hole of said lower surface.

2. The stackable module of claim 1, wherein said first and second transceivers each comprise:

an infrared transmitter; and an infrared detector.

3. The stackable module of claim 1, further comprising:

communication logic coupled to said first and second transceivers.

4. The stackable module of claim 3, further comprising:

a network device; and interface logic coupled to said communication logic and said network device.

5. The stackable module of claim 4, wherein said interface logic includes at least one status and configuration register.

6. The stackable module of claim 5, wherein said interface logic further includes memory.

7. A stackable module using infrared radiation to communicate with at least one other stackable module, comprising:

a housing having an upper surface and a lower surface, said upper surface having a first plurality of holes and said lower surface having a second plurality of holes, each aligned with a corresponding hole of said upper surface;

a first plurality of infrared transceivers mounted within said housing and aligned between corresponding holes of said upper and lower surfaces for transmitting information through a hole in said lower surface and for receiving information transmitted through a corresponding hole in said upper surface; and a second plurality of infrared transceivers mounted within said housing and aligned between corresponding holes of said upper and lower surfaces for transmitting information through a hole said upper surface and for receiving information transmitted through a corresponding hole in said lower surface.

8. A stack network system, comprising:

a chassis including a plurality of slots;

a plurality of stackable modules, each removably plugged into one of said plurality of slots and each comprising:
a housing adapted to plug into any one of said plurality of slots, said housing further comprising:
an upper surface having first and second holes; and
a lower surface having first and second holes aligned with said first and second holes of said upper surface, respectively;
a first infrared transceiver mounted within said housing and aligned between said first holes of said upper and lower surfaces for transmitting through said first hole of said lower surface and for receiving through said first hole of said upper surface; and
a second infrared transceiver mounted within said housing and aligned between said second holes of said upper and lower surfaces for transmitting through said second hole of said upper surface and for receiving through said second hole of said lower surface.

9. The stack network system of claim 8, wherein each of said plurality of stackable modules further comprises:
communication logic coupled to said first and second transceivers.

10. The stack network system of claim 8, further comprising:
a network device; and
interface logic coupled to said communication logic and said network device.

11. The stack network system of claim 9, wherein said communication logic operates said first and second transceivers in a bus configuration, wherein infrared radiation received is retransmitted by said first and second transceivers to a next one of said plurality of stackable modules.

12. The stack network system of claim 9, wherein said communication logic operates said first and second transceivers in a link configuration, wherein infrared radiation received by either of said first and second transceivers is decoded by said communication logic to determine the destination of decoded data, and wherein said infrared radiation is retransmitted by either said first transceiver or said second transceiver to a next one of said plurality of stackable modules if not intended for said communication logic.

13. The stack network system of claim 9, wherein said communication logic operates said first and second transceivers in a daisy-chain configuration, wherein infrared radiation received by said first transceiver is retransmitted to a next one of said plurality of stackable modules, and wherein infrared radiation received by said second transceiver is decoded by said communication logic to determine the destination of decoded data and retransmitted by said second transceiver to a next one of said plurality of stackable modules if not intended for said communication logic.

14. The stack network system of claim 9, wherein at least one of said plurality of stackable modules is a stack manager including management control logic coupled to said communication logic.

15. The stack network system of claim 14, further comprising:
a network manager; and
said stack manager including a network interface coupled to said management control logic and to said network manager.

16. The stack network system of claim 15, wherein said network manager is a computer system for controlling said stack manager.

17. The stack network system of claim 15, wherein said network manager and said stack manager are coupled together through a network communication interface.

18. The stack network system of claim 8, further comprising:
a top-mounted stack manager plugged into a top-most slot of said chassis.

19. The stack network system of claim 18, wherein said top-mounted stack manager comprises:
a lower surface having first and second holes;
an infrared transmitter mounted within said housing and aligned with said first hole of said lower surface of said top-mounted stack manager for transmitting through said first hole; and
an infrared decoder mounted within said housing and aligned with said second hole of said lower surface of said top-mounted stack manager for receiving through said second hole.

20. The stack network system of claim 8, further comprising:
a bottom-mounted stack manager plugged into a bottom-most slot of said chassis.

21. The stack network system of claim 18, wherein said bottom-mounted stack manager comprises:
an upper surface having first and second holes;
an infrared transmitter mounted within said housing and aligned with said first hole of said upper surface of said bottom-mounted stack manager for transmitting through said first hole; and
an infrared decoder mounted within said housing and aligned with said second hole of said upper surface of said bottom-mounted stack manager for receiving through said second hole.

* * * * *